United States Patent
Hamada (10) Patent No.: US 11,508,262 B2
(45) Date of Patent: Nov. 22, 2022

(54) SECURE READING AND WRITING APPARATUS, SECURE READING AND WRITING METHOD, AND PROGRAM

(71) Applicant: NIPPON TELEGRAPH AND TELEPHONE CORPORATION, Chiyoda-ku (JP)

(72) Inventor: Koki Hamada, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 324 days.

(21) Appl. No.: 16/645,588

(22) PCT Filed: Sep. 12, 2018

(86) PCT No.: PCT/JP2018/033849
§ 371 (c)(1),
(2) Date: Mar. 9, 2020

(87) PCT Pub. No.: WO2019/059069
PCT Pub. Date: Mar. 28, 2019

(65) Prior Publication Data
US 2020/0279511 A1  Sep. 3, 2020

(30) Foreign Application Priority Data
Sep. 21, 2017 (JP) .............................. JP2017-181264

(51) Int. Cl.
*G06F 21/00* (2013.01)
*G09C 1/00* (2006.01)
*G06F 21/71* (2013.01)

(52) U.S. Cl.
CPC .............. *G09C 1/00* (2013.01); *G06F 21/71* (2013.01)

(58) Field of Classification Search
CPC .................................. G09C 1/00; G06F 21/71
See application file for complete search history.

(56) References Cited

U.S. PATENT DOCUMENTS

2014/0007250 A1* 1/2014 Stefanov ............ G06F 21/6254
  726/26
2018/0107594 A1* 4/2018 Lee .................... G06F 12/1027
2019/0356341 A1* 11/2019 Ma ..................... H03M 13/6362

OTHER PUBLICATIONS

Tomas Toft, "Secure Datastructures based on Multiparty Computation", Dept. of Computer Science. Aarhus University, 2011, XP61004690, pp. 1-15.

(Continued)

*Primary Examiner* — Philip J Chea
*Assistant Examiner* — Rodman Alexander Mahmoudi
(74) *Attorney, Agent, or Firm* — Oblon, McClelland, Maier & Neustadt, L.L.P.

(57) ABSTRACT

Data is efficiently read from and written in a sequence without an access position being revealed. A secure reading and writing apparatus (1) receives a read command or a write command as input, and, when the read command is input, outputs a secret text [a[x]] which is an x-th element of a secret text sequence [a], and, when the write command is input, adds the secret text [a[x]] which is the x-th element of the secret text sequence [a], to a secret text [d]. A secure reading part (12) reads the secret text [a[x]] which is the x-th element from the secret text sequence [a]. A buffer addition part (13) adds a secret text [c] of an unreflected value c to the secret text [a[x]]. A buffer appending part (14) appends a secret text [x] and the secret text [d] to a write buffer [b]. When the number of elements of the write buffer [b] exceeds a predetermined value, a secure writing part (15) adds a value indicated with a secret text vector $[b_1]$ to an access position of the secret text sequence [a] which is indicated with a secret text vector $[b_0]$.

6 Claims, 4 Drawing Sheets

(56) References Cited

OTHER PUBLICATIONS

International Search Report dated Dec. 11, 2018 in PCT/JP2018/033849 filed on Sep. 12, 2018, 2 pages.
Hamada, K., "A Sublinear-Communications Constant-Rounds Array Access Algorithm for Secure Multi-party Computation," Computer Security Symposium, Oct. 2017, pp. 757-764 (with English Abstract).
Chida, K. et al., "A Three-Party Secure Function Evaluation with Lightweight Verifiability Revisited," CSS, 2010, 6 total pages (with English Abstract).
Keller, M. et al., "Efficient, Oblivious Data Structures for MPC," ASIACRYPT, Part II, LNCS, vol. 8874, 2014, pp. 506-525.

* cited by examiner

SECURE READING AND WRITING APPARATUS, SECURE READING AND WRITING METHOD, AND PROGRAM

TECHNICAL FIELD

The present invention relates to a cryptography application technology, and, particularly, to a technique of reading data from and writing data in a sequence without revealing an access position.

BACKGROUND ART

As a method for obtaining a particular computation result without reconstructing an encrypted numerical value, there is a method called secure computation (see, for example, Non-patent literature 1). With the method disclosed in Non-patent literature 1, by encryption being performed so that fragments of numerical values are distributed to three secure computation apparatuses, and the three secure computation apparatuses performing cooperative computation, it is possible to maintain a state where results of addition and subtraction, constant addition, multiplication, constant multiplication, logical operation (NOT, AND, OR, EXCLUSIVE-OR) and data format conversion (integer, binary) are distributed to the three secure computation apparatuses, that is, encrypted without the numerical values being reconstructed.

In a case where the i-th data of a sequence is read, or a value d is written in the i-th data of the sequence without an access position i being revealed, it is often pretended that all elements have been accessed (see, for example, Non-patent literature 2).

PRIOR ART LITERATURE

Non-Patent Literature

Non-patent literature 1: Koji Chida, Koki Hamada, Dai Ikarashi, Katsumi Takahashi, "Reconsideration of Lightweight Verifiable Three-party Secure Function Evaluation", CSS, 2010

Non-patent literature 2: Marcel Keller and Peter Scholl, "Efficient, oblivious data structures for MPC", Advances in Cryptology—ASIACRYPT 2014, Vol. 8874 of Lecture Notes in Computer Science, pp. 506-525, 2014.

SUMMARY OF THE INVENTION

Problems to be Solved by the Invention

However, with related art disclosed in Non-patent literature 2, a communication amount $\Omega(n)$ is required to read data from and write data in a sequence having a size n through constant-depth communication.

In view of the above-described points, it is an object of the present invention to enable efficient reading and writing data from and in a sequence with a smaller communication amount than that in related art without an access position being revealed through constant-depth communication.

Means to Solve the Problems

To solve the above-described problem, a secure reading and writing apparatus of the present invention is a secure reading and writing apparatus which receives a read command including a secret text sequence $[a]=([a[0]], [a[1]], \ldots, [a[n-1]])$ having a size n and a secret text $[x]$ of an access position x, or a write command including the secret text sequence $[a]$, the secret text $[x]$, and a secret text $[d]$ of a value d to be written as input, and, when the read command is input, outputs a secret text $[a[x]]$ which is an x-th element of the secret text sequence $[a]$, and, when the write command is input, adds the secret text $[d]$ to the secret text $[a[x]]$ which is the x-th element of the secret text sequence $[a]$, the secure reading and writing apparatus comprising a buffer storage part configured to store a write buffer $[b]=([b_0], [b_1])$ comprised of two secret text vectors $[b_0]$ and $[b_1]$, a buffer appending part configured to, when the write command is input, append the secret text $[x]$ to the secret text vector $[b_0]$, and append the secret text $[d]$ to the secret text vector $[b_1]$, a secure writing part configured to, when the number of elements of the write buffer $[b]$ exceeds a predetermined value, add a value indicated with the secret text vector $[b_1]$ to an access position indicated with the secret text vector $[b_0]$ among the secret text sequence $[a]$, a secure reading part configured to, when the read command is input, read the secret text $[a[x]]$ which is the x-th element from the secret text sequence $[a]$, and a buffer addition part configured to add a secret text $[c]$ of an unreflected value c which is a sum of elements in which the access position indicated with the secret text vector $[b_0]$ is equal to an access position indicated with the secret text $[x]$ among elements of the secret text vector $[b_1]$, to the secret text $[a[x]]$ which is the x-th element of the secret text sequence $[a]$.

Effects of the Invention

According to the secure reading and writing technique of the present invention, it is possible to efficiently read data from and write data in a sequence with a smaller communication amount than that in related art without an access position being revealed through constant-depth communication.

DETAILED DESCRIPTION OF THE EMBODIMENTS

Prior to the description of embodiments, a notation method and definition of terms in this specification will be described.

<Notation Method>

A value obtained by concealing a certain value "a" through encryption, secret sharing, or the like, will be referred to as a secret text of "a", and expressed as $[a]$. Further, "a" is referred to as a plain text of $[a]$. In a case where concealment is performed through secret sharing, an aggregate of fragments of secret sharing, possessed by respective secure computation apparatuses is referred to by $[a]$. The i-th element of the vector $a=(a_0, a_1, \ldots)$ will be referred to by $a[i]$. The concatenation of a vector a and a vector b will be expressed as $a\|b$. The number of elements of the vector a will be expressed as |a|. An absolute value of a real number x will be expressed as |x|.

$\lfloor x \rfloor$ is a floor function, and indicates a maximum integer equal to or less than a real number x.

$\lceil x \rceil$ is a ceiling function and indicates a minimum integer equal to or greater than the real number x.

<Addition, Subtraction, Multiplication>

In each operation of addition, subtraction and multiplication to be performed on a secret text, secret texts [a] and [b] of two values a and b are input, and secret texts [$c_1$], [$c_2$] and [$c_3$] of $c_1$, $c_2$ and $c_3$ which are respectively computation results of a+b, a−b and ab are computed. Execution of these kinds of operation will be expressed as in the following expressions.

[$C_1$]←Add([a],[b]),

[$c_2$]←Sub([a],[b]),

[$c_3$]←Mul([a],[b])

In a case where there is no possibility that misunderstanding is caused, Add([a], [b]), Sub([a], [b]), and Mul([a], [b]) will be respectively abbreviated as [a]+[b], [a]−[b] and [a][b].

<Equality Testing>

Processing in which the secret texts [a] and [b] of two values a and b are input, and a secret text [c] in which, if a=b, c=1, and, if a≠b, c=0, is computed will be expressed as in the following expression.

$$[c] \leftarrow \left([a] \stackrel{?}{=} [b]\right)$$

Embodiments of the present invention will be described in detail below. Note that, in the drawings, the same reference numerals will be assigned to component parts having the same functions, and redundant description will be omitted.

Figure 1:
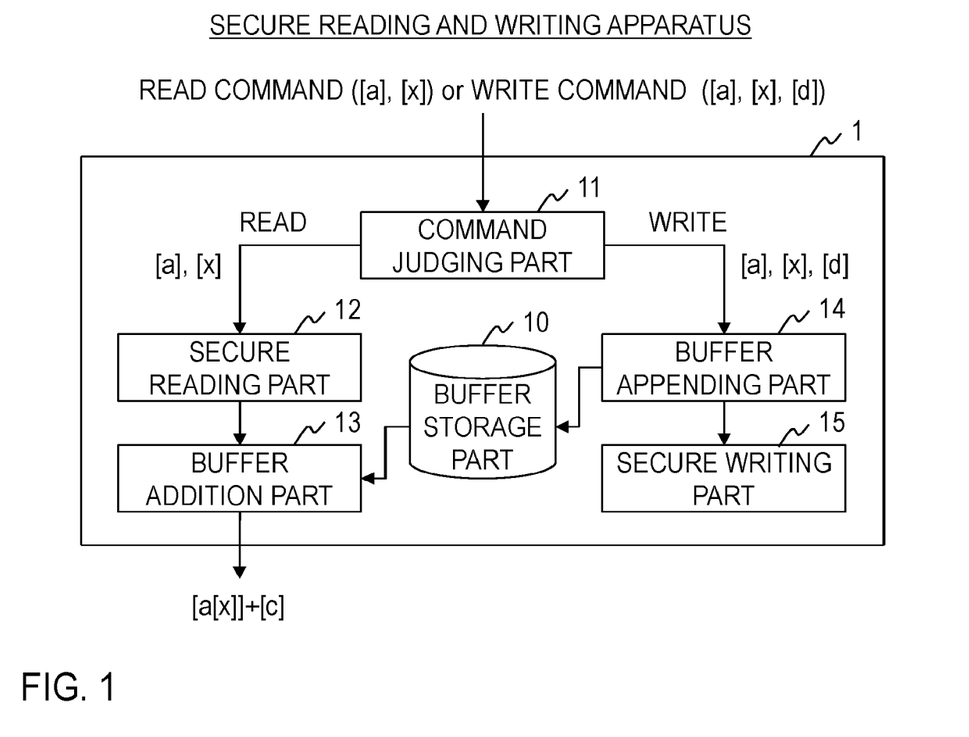
FIG. 1 is a view illustrating a functional configuration of a secure reading and writing apparatus.

As illustrated in FIG. 1, the secure reading and writing apparatus 1 of the embodiment includes a buffer storage part 10, a command judging part 11, a secure reading part 12, a buffer addition part 13, a buffer appending part 14 and a secure writing part 15. By this secure reading and writing apparatus 1 performing processing in each step illustrated in FIG. 2, the secure reading and writing method of the embodiment is implemented.

The secure reading and writing apparatus 1 is, for example, a special apparatus configured by a special program being read into a publicly-known or dedicated computer having a central processing unit (CPU), a random access memory (RAM), or the like. The secure reading and writing apparatus 1, for example, executes respective kinds of processing under control of the CPU. Data input to the secure reading and writing apparatus 1 and data obtained through respective kinds of processing are, for example, stored in the RAM, and the data stored in the RAM is read out to the CPU as necessary, and is utilized for other processing. At least part of respective processing parts of the secure reading and writing apparatus 1 may be configured with hardware such as an integrated circuit.

Figure 2:
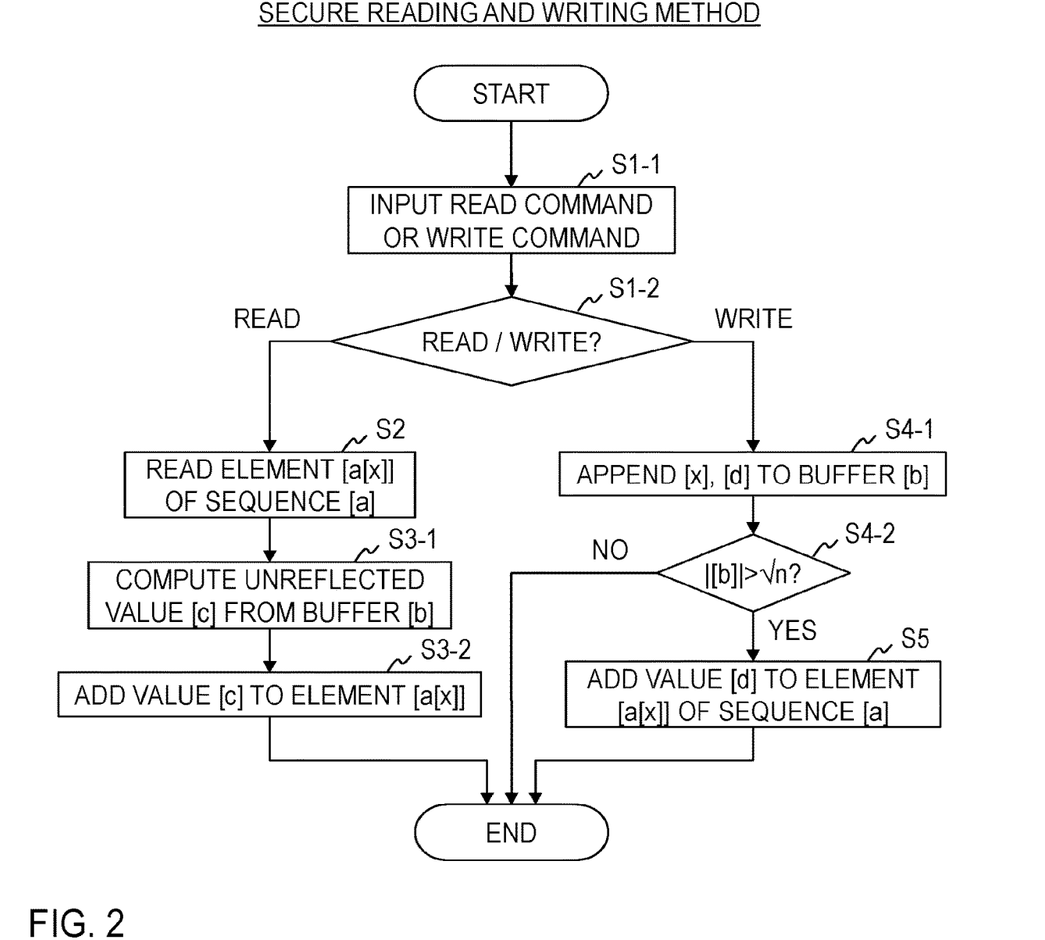
FIG. 2 is a view illustrating processing procedure of a secure reading and writing method.

The secure reading and writing method to be executed by the secure reading and writing apparatus 1 of the embodiment will be described below with reference to FIG. 2.

In the buffer storage part 10, a write buffer [b]=([$b_0$], [$b_1$]) for storing the input write command is stored. [$b_0$] is a secret text vector [$b_0$]=([$b_0$[0]], [$b_0$[1]], . . . , [$b_0$[m−1]]) of an access position. [$b_1$] is a secret text vector [$b_1$]=([$b_1$[0]], [$b_1$[1]], . . . , [$b_1$[m−1]]) of a value to be written. However, m is the number of elements of the write buffer [b], and m=|[b]|.

In step S1-1, the command judging part 11 receives the read command or the write command as input. The read command includes a secret text sequence [a]=([a[0]], [a[1]], [a[n−1]]) having a size n, and a secret text [x] of an access position x. The write command includes the secret text sequence [a]=([a[0]], [a[1]], [a[n−1]]) having a size n, the secret text [x] of the access position x, and a secret text [d] of a value d to be written.

In step S1-2, if the input is the read command, the command judging part 11 outputs the secret text sequence [a] and the secret text [x] of the access position to the secure reading part 12, and makes the processing proceed to step S2. Meanwhile, if the input is the write command, the command judging part 11 outputs the secret text sequence [a], the secret text [x] of the access position and the secret text [d] of the value to be written to the buffer appending part 14, and makes the processing proceed to step S4-1.

In step S2, the secure reading part 12 reads the secret text [a[x]] which is the x-th element from the secret text sequence [a] while the access position x is concealed. As a method for reading an element from a sequence while concealing an access position, for example, the method disclosed in Non-patent literature 2 can be used. Further, if a secure reading method which will be described later is used, it is possible to perform reading more efficiently. The secure reading part 12 outputs the secret text [a[x]] which is the x-th element of the sequence [a] which is read out to the buffer addition part 13.

In step S3-1, the buffer addition part 13 computes a secret text [c] of an unreflected value c using the write buffer [b] stored in the buffer storage part 10. Specifically, the secret text [c] is computed using formula (1).

$$[c] = \sum_{b_0[i]=x} [b_1[i]] \qquad (1)$$

Alternatively, the secret text [c] of the unreflected value c is computed using formula (2).

$$[c] = \sum_{i=0}^{n-1} \left([b_1[i]] \times \left([b_0[i]] \stackrel{?}{=} [x]\right)\right) \qquad (2)$$

In step S3-2, the buffer addition part 13 adds the secret text [c] of the unreflected value c to the secret text [a[x]] which is the x-th element of the sequence [a] output by the secure reading part 12, sets a secret text [a[x]]+[c] as the secret text [a[x]] which is the x-th element of the sequence [a], and sets the secret text as output of the secure reading and writing apparatus 1.

In step S4-1, the buffer appending part 14 appends the secret text [x] of the access position and the secret text [d] of the value to be written to the write buffer [b] stored in the buffer storage part 10. Specifically, it is set such that m=|[b]|, and [b[m]]=([$b_0$[m]], [$b_1$[m]])=([x], [d]).

In step S4-2, the buffer appending part 14 determines whether or not the number of elements |[b]| of the write buffer [b] exceeds √n. In a case where the number of elements |[b]| of the write buffer [b] exceeds √n (that is,

|[b]|>√n), the processing proceeds to step S5. Further, in a case where the number of elements |[b]| of the write buffer [b] is equal to or less than (that is, |[b]|≤√n), the processing is finished.

In step S5, the secure writing part 15 adds the secret text [d] of the value to be written to the secret text a[x] which is the x-th element of the sequence while the access position x is concealed, using the secret text vector $[b_0]=([b_0[0]], [b_0[1]], [b_0[m-1]])$ of the access position and the secret text vector $[b_1]=([b_1[0]], [b_1[1]], [b_1[m-1]])$ of the value to be written stored in the write buffer [b]. As a method for writing a value in a sequence while concealing an access position, for example, the method disclosed in Non-patent literature 2 can be used. Further, if a secure writing method which will be described later is used, it is possible to perform writing more efficiently.

Figure 3:
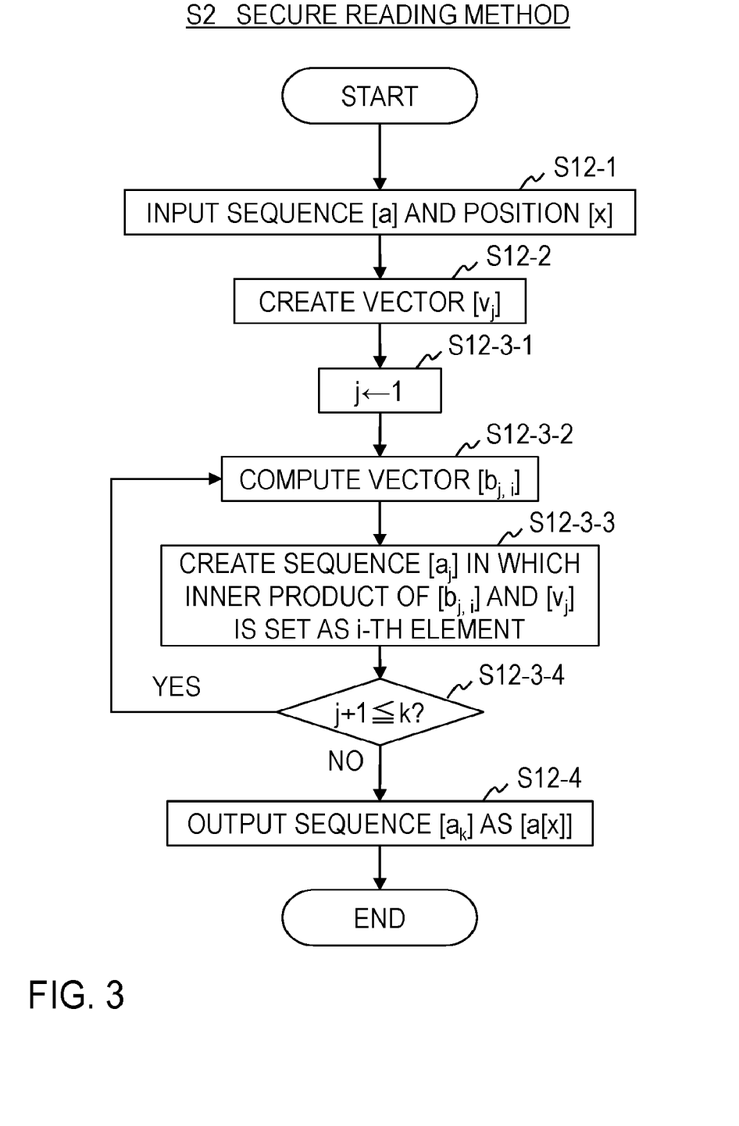
FIG. 3 is a view illustrating processing procedure of a secure reading part.

With reference to FIG. 3, a method in which the secure reading part 12 efficiently reads data from a sequence will be described below.

In step S12-1, the secure reading part 12 receives the secret text sequence $[a]=([a[0]], [a[1]], [a[n-1]])$ having a size n and the secret text [x] of the access position x as input.

In step S12-2, the secure reading part 12 creates a vector of k secret texts $[v_j]$. However, k is an integer equal to or greater than 2, and j is each integer equal to or greater than 1 and equal to or less than k. Specifically, the secret text vector $[v_j]$ having a size $m_j$ in which $m_1, m_2, \ldots, m_k$ are set as natural numbers satisfying $n \leq m_1 \times m_2 \times \ldots \times m_k$, and $x_j$ is set as an integer defined in the formula (3) for each integer j, and the $(x_j \bmod m_j)$-th element is 1, and other elements are 0, is created.

$$x_j = \left\lfloor \frac{x}{m_1 \times m_2 \times \ldots \times m_{j-1}} \right\rfloor \quad (3)$$

Particularly, if each input secret text is a share obtained through (t, s) Shamir secret sharing, k, $m_i$ (i=1, 2, ..., k) can be set as in formula (4). Note that (t, s) Shamir secret sharing is secret sharing in which distributed values obtained by dividing an input plain text into s pieces are stored in s secure computation apparatuses, and if arbitrary t shares are collected, the plain text can be reconstructed, while any information regarding the plain text cannot be obtained from less than t shares. At this time, t is an integer equal to or greater than 1, and s≥2t−1.

$$k = \left\lfloor \frac{s-1}{t-1} \right\rfloor, \quad m_i = \lceil n^{1/k} \rceil \quad (4)$$

In step S12-3-1, the secure reading part 12 initializes j to 1.

In step S12-3-2, the secure reading part 12 creates a vector of $n_j$ secret texts $[b_{j,i}]$ using a secret text sequence $[a_{j-1}]$. At this time, the secret text sequence $[a]=([a[0]], [a[1]], \ldots, [a[n-1]])$ is dealt with as the secret text sequence $[a_0]=([a_0[0]], [a_0[1]], [a_0[n-1]])$. The number $n_j$ of the secret text vector $[b_{j,i}]$ to be created differs depending on a value of j. Specifically, the secret text vector $[b_{j,i}]$ is computed assuming that $n_j$ is an integer defined in formula (5), i is set as each integer equal to or greater than 0 and less than $n_j$, and $[b_{j,i}]=([j_{-}[m_j i+0]], [a_{j-1}[m_j i+1]], \ldots, [a_{j-1}[m_j i+m_j-1]])$ (where, if $\lambda=|a_{j-1}|$, $[a_{j-1}[\lambda]]=0$).

$$n_j = \left\lceil \frac{n}{m_1 \times m_2 \times \ldots \times m_j} \right\rceil \quad (5)$$

In step S12-3-3, the secure reading part 12 computes a secret text sequence $[a_j]$ in which an inner product of the secret text vector $[b_{j,j}]$ and the secret text vector $[v_j]$ is set as the i-th element.

In step S12-3-4, the secure reading part 12 determines whether or not j+1 is equal to or less than k (j+1≤k), and if j+1 is equal to or less than k, increments j (j←j+1) and returns the processing to step S12-3-2, while, if j+1 is greater than k (j+1>k), outputs a secret text sequence $[a_k]$. Note that, at this time, the secret text sequence $[a_k]$ is a sequence having the number of elements of 1.

In step S12-4, the secure reading part 12 outputs the secret text sequence $[a_k]$ having the number of elements of 1 as the secret text [a[x]] which is the x-th element of the secret text sequence [a].

Figure 4:
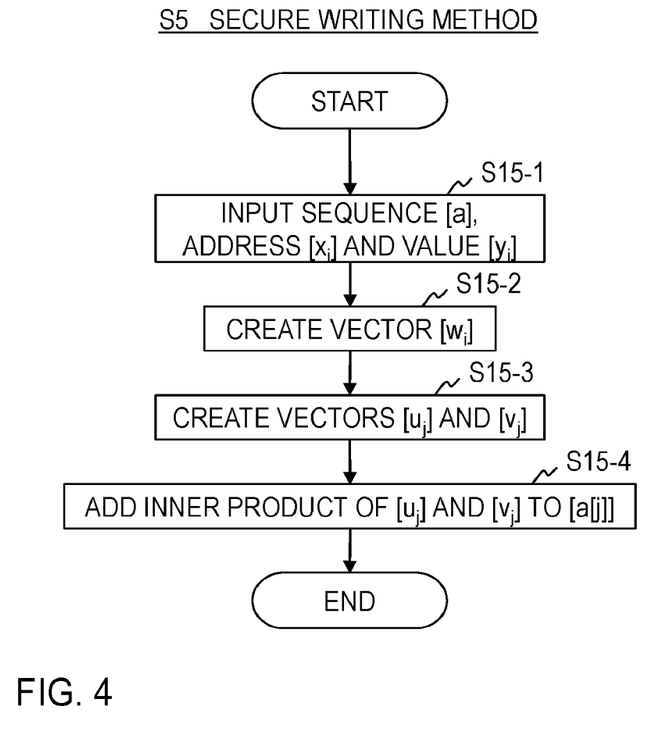
FIG. 4 is a view illustrating processing procedure of a secure writing part.

With reference to FIG. 4, a method in which the secure writing part 15 efficiently writes data in a sequence will be described below.

In step S15-1, the secure writing part 15 receives the secret text sequence $[a]=([a[0]], [a[1]], \ldots, [a[n-1]])$ having a size n, the secret text vector $[b_0]$ of the access position and the secret text vector $[b_1]$ of the value to be written as input. In the following description, the secret text vector $[b_0]$ of the access position is dealt with as a secret text $[x_i]$, and the secret text vector $[b_1]$ of the value to be written is dealt with as a secret text $[y_i]$. However, m is set as the number of elements |[b]| of the write buffer [b], and i is each integer equal to or greater than 0 and less than in.

In step S15-2, the secure writing part 15 creates a secret text vector $[w_i]$ which expresses a write address $x_i$ of each value $y_i$. Specifically, secret text vectors $[p_i], [q_i]$ in which $n_1$ and $n_2$ are set as natural numbers satisfying $n_1 n_2 \geq n$, $p_i[\lambda_1] q_i[\lambda_2]$ becomes $[y_i]$ when $n_2 \lambda_1 + \lambda_2 = x_i$, otherwise, becomes 0, are created, and the secret text vectors $[p_i], [q_i]$ are concatenated to generate a secret text vector $[w_i]=[p_i]\|[q_i]$. At this time, the secret text vector $[p_i]$ may be a secret text vector having a size $n_1$ in which an element of $[p_i[\lfloor x_i/n_2 \rfloor]]$ is 1, and other elements are 0, and the secret text vector $[q_i]$ may be a secret text vector having a size $n_2$ in which an element of $[q_i[x_i \bmod n_2]]$ is $[y_i]$, and other elements are 0.

Particularly, if each input secret text is a share obtained through (t, s) Shamir secret sharing, $n_1$ and $n_2$ can be set as in formula (6). Note that (t, s) Shamir secret sharing is secret sharing in which distributed values obtained by dividing an input plain text into s pieces are stored in s secure computation apparatuses, and, if arbitrary t shares are collected, the plain text can be reconstructed, while any information regarding the plain text cannot be obtained from less than t shares. At this time, t is an integer equal to or greater than 1, and s≥2t−1.

$$n_1, n_2 = \lceil \sqrt{n} \rceil \quad (6)$$

In step S15-3, the secure writing part 15 selects elements from the secret text vector $[w_i]$ to generate secret text vectors $[u_j], [v_j]$ while setting j as each integer equal to or greater than 0 and less than n. Specifically, $\lambda_1$ and $\lambda_2$ are expressed as in formula (7) while i is set as each integer equal to or greater than 0 and less than m, and j is set as each integer equal to or greater than 0 and less than n.

$$\lambda_1 = \lfloor j/n_2 \rfloor,$$

$$\lambda_2 = j \bmod n_2 \quad (7)$$

The secret text vectors $[u_j]$ and $[v_j]$ are generated as in formula (8).

$$[u_j[i]] = [p_i[\lambda_1]],$$

$$[v_j[i]] = [q_i[\lambda_2]] \quad (8)$$

In step S15-4, the secure writing part 15 adds an inner product of the secret text vector $[u_j]$ and the secret text vector $[v_j]$ to a secret text $[a[j]]$ which is the j-th element in the sequence [a] while j is set as each integer equal to or greater than 0 and less than n.

The present invention utilizes features that reading from a buffer can be performed with a communication amount which is linear with respect to a buffer size, and that a secure writing method can be implemented with a communication amount of O(n) when the buffer size is O(√n). By actual writing being suspended until the buffer size exceeds √n, reading can be always realized with a communication amount of O(√n), and writing can be realized with a communication amount of O(n) only once, in addition to a communication amount of O(√n) each time.

While the embodiments of the present invention have been described above, a specific configuration is not limited to these embodiments, and it goes without saying that change, or the like, of design is incorporated into the present invention as appropriate within a scope not deviating from the gist of the present invention. Various kinds of processing described in the embodiments are not only executed in a chronological order in accordance with order of description, but may be executed in parallel or individually in accordance with processing performance of an apparatus which executes the processing or as necessary.

[Program, Recording Medium]

In a case where various kinds of processing functions at the respective apparatuses described in the above-described embodiments are implemented with a computer, processing content of functions which should be provided at the respective apparatuses is described with a program. Further, by this program being executed in the computer, various kinds of processing functions at the above-described respective apparatuses are realized on the computer.

The program describing this processing content can be recorded in a computer-readable recording medium. The computer-readable recording medium may be, for example, any medium such as a magnetic recording apparatus, an optical disk, a magnetooptical recording medium and a semiconductor memory.

Further, this program is distributed by, for example, a portable recording medium such as a DVD and a CD-ROM in which the program is recorded, being sold, given, lent, or the like. Still further, it is also possible to employ a configuration where this program is stored in a storage apparatus of a server computer, and the program is distributed by being transferred from the server computer to other computers over a network.

A computer which executes such a program, for example, first, stores the program recorded in the portable recording medium or the program transferred from the server computer in a storage apparatus of the own computer once. Then, upon execution of the processing, this computer reads the program stored in the storage apparatus of the own computer and executes processing in accordance with the read program. Further, as another execution form of this program, the computer may directly read the program from the portable recording medium and execute processing in accordance with the program, and further, every time a program is transferred from the server computer to this computer, the computer may sequentially execute processing in accordance with the received program. Still further, it is also possible to employ a configuration where the above-described processing is executed through so-called ASP (Application Service Provider) service in which processing functions are realized only through an execution instruction and a result acquisition without the program being transferred from the server computer to this computer. Note that the program in the present embodiment includes information which is provided to be used for processing by an electronic computer and which is equivalent to a program (such as data which is not a direct command to the computer but has property of defining processing of a computer).

Further, while, in the present embodiment, the present apparatus is configured by a predetermined program being executed on a computer, at least part of the processing content may be realized with hardware.

What is claimed is:

1. A secure reading and writing apparatus which receives a read command including a secret text sequence $[a]=([a[0]], [a[1]], \ldots, [a[n-1]])$ having a size n and a secret text $[x]$ of an access position x, or a write command including the secret text sequence $[a]$, the secret text $[x]$ and a secret text $[d]$ of a value d to be written as input, and, when the read command is input, outputs a secret text $[a[x]]$ which is an x-th element of the secret text sequence $[a]$, and, when the write command is input, adds the secret text $[d]$ to the secret text $[a[x]]$ which is the x-th element of the secret text sequence $[a]$, the secure reading and writing apparatus comprising processing circuitry configured to:

store a write buffer $[b]=([b_0], [b_1])$ comprised of two secret text vectors $[b_0]$ and $[b_1]$;

when the write command is input, append the secret text $[x]$ to the secret text vector $[b_0]$, and append the secret text $[d]$ to the secret text vector $[b_1]$;

when the number of elements of the write buffer $[b]$ exceeds a predetermined value, add a value indicated with the secret text vector $[b_1]$ to an access position indicated with the secret text vector $[b_0]$ among the secret text sequence $[a]$;

when the read command is input, read the secret text $[a[x]]$ which is the x-th element from the secret text sequence $[a]$; and add a secret text $[c]$ of an unreflected value c which is a sum of elements in which the access position indicated with the secret text vector $[b_0]$ is equal to an access position indicated with the secret text $[x]$ among elements of the secret text vector $[b_1]$, to the secret text $[a[x]]$ which is the x-th element of the secret text sequence $[a]$.

2. The secure reading and writing apparatus according to claim 1, wherein the processing circuitry computes the secret text $[c]$ of the unreflected value c using the following formula:

$$[c] = \sum [b_0[i] = x][b_1[i]].$$

3. The secure reading and writing apparatus according to claim 1,
wherein the processing circuitry computes the secret text [c] of the unreflected value c using the following formula:

$$[c] = \sum_{i=0}^{n-1}\left([b_1[i]] \times \left([b_0[i]] \stackrel{?}{=} [x]\right)\right).$$

4. The secure reading and writing apparatus according to claim 1,
wherein the secret text sequence [a], the secret text [x] and the secret text [d] are concealed through secret sharing in which, among shares obtained by dividing a plain text into s pieces, if arbitrary t shares are collected, the plain text can be reconstructed, while any information regarding the plain text cannot be obtained from less than t shares, where t is set as an integer equal to or greater than 1, and s≥2t−1;
the processing circuitry reads the secret text [a[x]] which is the x-th element from the secret text sequence [a] without the access position x being revealed; and
when the number of elements of the write buffer exceeds √n, the processing circuitry writes a value indicated with the secret text vector [b₁] to the access position indicated with the secret text vector [b₀] of the secret text sequence [a] without the access position x being revealed.

5. A secure reading and writing method to be executed by a secure reading and writing apparatus which receives a read command including a secret text sequence [a]=([a[0]], [a[1]], ..., [a[n−1]]) having a size n and a secret text [x] of an access position x, or a write command including the secret text sequence [a], the secret text [x] and a secret text [d] of a value d to be written as input, and, when the read command is input, outputs a secret text [a[x]] which is an x-th element of the secret text sequence [a], and, when the write command is input, adds the secret text [d] to the secret text [a[x]] which is the x-th element of the secret text sequence [a],
the secure reading and writing method comprising performing by processing circuitry of the secure reading and writing apparatus:
storing a write buffer [b]=([b₀], [b₁]) comprised of two secret text vectors [b₀] and [b₁];
when the write command is input, appending the secret text [x] to the secret text vector [b₀], and appending the secret text [d] to the secret text vector [b₁];
when the number of elements of the write buffer [b] exceeds a predetermined value, adding a value indicated with the secret text vector [b₁] to an access position indicated with the secret text vector [b₀] among the secret text sequence [a];
when the read command is input, reading the secret text [a[x]] which is the x-th element from the secret text sequence [a]; and
adding a secret text [c] of an unreflected value c which is a sum of elements in which the access position indicated with the secret text vector [b₀] is equal to an access position indicated with the secret text [x] among elements of the secret text vector [b₁], to the secret text [a[x]] which is the x-th element of the secret text sequence [a].

6. A non-transitory computer readable medium having a program recorded thereon for causing a computer to function as a secure reading and writing apparatus which receives a read command including a secret text sequence [a]=([a[0]], [a[1]], ..., [a[n−1]]) having a size n and a secret text [x] of an access position x, or a write command including the secret text sequence [a], the secret text [x] and a secret text [d] of a value d to be written as input, and, when the read command is input, outputs a secret text [a[x]] which is an x-th element of the secret text sequence [a], and, when the write command is input, adds the secret text [d] to the secret text [a[x]] which is the x-th element of the secret text sequence [a],
the secure reading and writing apparatus comprising processing circuitry configured to:
store a write buffer [b]=([b₀], [b₁]) comprised of two secret text vectors [b₀] and [bᵢ];
when the write command is input, append the secret text [x] to the secret text vector [b₀], and append the secret text [d] to the secret text vector [bᵢ];
when the number of elements of the write buffer [b] exceeds a predetermined value, add a value indicated with the secret text vector [b₁] to an access position indicated with the secret text vector [b₀] among the secret text sequence [a];
when the read command is input, read the secret text [a[x]] which is the x-th element from the secret text sequence [a]; and
add a secret text [c] of an unreflected value c which is a sum of elements in which the access position indicated with the secret text vector [b₀] is equal to an access position indicated with the secret text [x] among elements of the secret text vector [b₁], to the secret text [a[x]] which is the x-th element of the secret text sequence [a].

* * * * *

UNITED STATES PATENT AND TRADEMARK OFFICE
CERTIFICATE OF CORRECTION

PATENT NO. : 11,508,262 B2
APPLICATION NO. : 16/645588
DATED : November 22, 2022
INVENTOR(S) : Koki Hamada It is certified that error appears in the above-identified patent and that said Letters Patent is hereby corrected as shown below:

In the Claims

In Claim 6, Column 10, Line 31, please change from "secret text vectors $[b_0]$ and $[b_i]$" to -- secret text vectors $[b_0]$ and $[b_1]$ --.

In Claim 6, Column 10, Line 34, please change from "secret text vector $[b_i]$" to -- secret text vector $[b_1]$ --.

Signed and Sealed this
Eleventh Day of April, 2023

Katherine Kelly Vidal
*Director of the United States Patent and Trademark Office*